United States Patent [19]

Katoh et al.

[11] 4,114,710
[45] Sep. 19, 1978

[54] CARRIER REGENERATION CIRCUIT

[75] Inventors: Tadayoshi Katoh; Eiji Itaya, both of Kawasaki, Japan

[73] Assignee: Fujitsu Limited, Kawasaki, Japan

[21] Appl. No.: 716,183

[22] Filed: Aug. 20, 1976

[30] Foreign Application Priority Data

Aug. 20, 1975 [JP] Japan .............................. 50-100762

[51] Int. Cl.$^2$ .......................................... H04L 27/24
[52] U.S. Cl. .................................... 178/67; 325/324; 178/88; 325/40
[58] Field of Search ................. 325/49, 50, 30, 320, 325/419, 40, 321, 324; 178/67, 68, 88; 329/110, 122, 50, 104, 105

[56] References Cited

U.S. PATENT DOCUMENTS

| | | | |
|---|---|---|---|
| 3,529,290 | 9/1970 | Schroeder | 178/67 |
| 3,590,381 | 6/1971 | Ragsdale | 325/30 |
| 3,845,412 | 10/1974 | Rearwin | 325/30 |
| 3,984,634 | 10/1976 | Painter | 178/88 |
| 4,010,323 | 3/1977 | Peck | 329/122 |
| 4,024,342 | 5/1977 | Croisier | 178/67 |

Primary Examiner—John C. Martin
Assistant Examiner—Michael A. Masinick
Attorney, Agent, or Firm—Staas & Halsey

[57] ABSTRACT

A carrier regeneration circuit regenerates the carrier from the QAM (Quadrature Amplitude Modulated) received signal, as produced and transmitted by a quadrature partial response modulation system wherein quadrature-related carriers (i.e., having a phase difference of 90°) of the same frequency are amplitude modulated with two parallel signals which have been subject to partial response conversion. The carrier regeneration circuit comprises a probability decision circuit which decides the probability of generation of particular demodulated data code combinations, and a carrier regeneration control circuit which maintains the phase ambiguity of the regenerated carrier within an integer multiple of 90°. The control circuit responds to the output of the probability decision circuit for selectively shifting the phase of the regenerated carrier by 45°.

7 Claims, 17 Drawing Figures

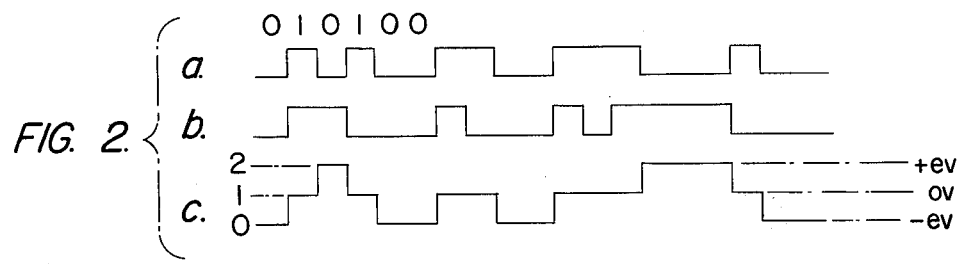
FIG. 2.
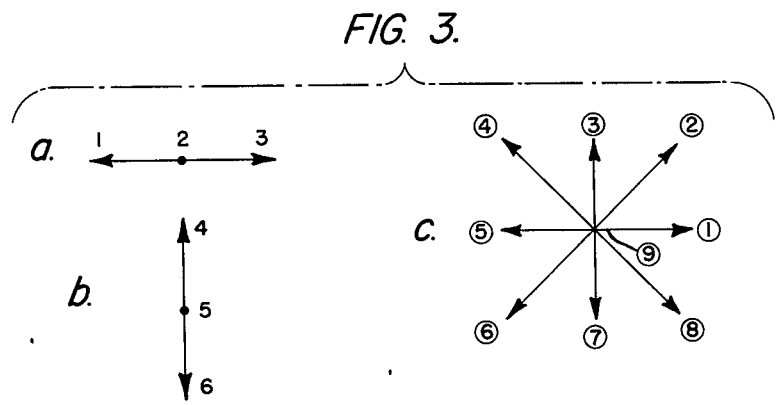
FIG. 3.
FIG. 4.

CARRIER REGENERATION CIRCUIT

BACKGROUND OF THE INVENTION

1. Field of the Invention

The present invention relates to a carrier regeneration circuit, and more specifically, to a carrier regeneration circuit for regenerating the carrier for demodulation in a quadrature partial response modulation system.

2. Description of the Prior Art

In the field of data transmission, partial response systems are well known. Namely, by transmitting the symbols by means of the waveform having a constant intersymbol interference in one bit or more, frequency spectrum of the response waveform can be reduced, thus transmission bandwidth can be saved. Such method is called the duo binary, and its general method is the partial response system. For example, this partial response system is described in the papers: "Generalization of Techniques for Binary Data Communication" by E. R. Kretzner, IEEE Transactions on Communication Technology, April 1966, Volumn COM-14, No. 1, pp 67–68; and in "Data Transmission Using Controlled Intersymbol Interference" by K. H. Schmidt, Electrical Communication Volume 48, No. 1 and 2, 1973.

In class 1 partial response systems, an input pulse is converted into a pulse of a doubled width and accordingly preceding and succeeding pulses are superimposed. Thus, a 2-level digital input signal becomes a 3-level signal.

In such a partial response system, it is necessary to accumulate the preceding element (bit) group in order to demodulate the signal which was subjected to partial response conversion, thereby to return to the initial 2-level signal. Because of this, a problem arises in that erroneous propagation occurs during demodulation. Thus, symbol processing, called precoding, is performed before the partial response conversion. To amplify, for a 2-level digital signal having the levels "0" and "1" and converted in accordance with partial response conversion to the levels of "0", "1", and "2", for example, the code conversion is always performed so that the level "1" of the converted, partial response signal corresponds to the level "1" of the initial 2-level input digital signal.

Quadrature amplitude modulation systems as well are known in the prior art. In such systems, quadrature-related carriers, i.e., carriers of the same frequencies but having a phase difference therebetween of 90°, are independently amplitude modulated and then combined into a QAM (Quadrature Amplitude Modulation) signal. An ordinal 4 phase PSK (Phase Shift Keying) modulation system is a kind of QAM system. The configuration of the quadrature amplitude modulation system is shown, for example, in FIG. 8 of the U.S. Pat. No. 3,806,807.

Demodulation of a QAM signal at the receiver, or receiving side of this system, is performed by regenerating the carrier and synchronously detecting the received QAM signal with the regenerated carrier.

In this case, when the phase of the regenerated carrier skips to a different stable phase, there results an error in the demodulated data. The fact that the phase of the regenerated carrier is not determined precisely as one specific, absolute phase, is generally referred to as phase ambiguity of the regenerated carrier.

Methods have been proposed whereby demodulation can be achieved correctly, in spite of phase ambiguity of the regenerated carrier, through use of differential encoding, by modulating two carriers for quadrature amplitude modulation with the signal which has been subjected to the partial response conversion. In this case, it is necessary that the phase ambiguity of the regenerated carrier is a multiple of 90°.

Reference is made at this juncture to the concurrently filed application of Tadayoshi Katoh, U.S. application Ser. No. 716,098 entitled PARTIAL RESPONSE, QUADRATURE AMPLITUDE MODULATION SYSTEM, the teachings of which are incorporated herein by reference.

SUMMARY OF THE INVENTION

The present invention provides a carrier regeneration circuit which regenerates the carrier in such a way that the phase of the carrier used for demodulating a received signal theretofore modulated by a quadrature partial response modulation system is considered to be the specified phase for the modulation vector and the phase ambiguity of the regenerated carrier is a multiple of 90°.

The carrier regeneration circuit of the present invention, for regenerating the carrier from a received, modulated signal of a quadrature partial response modulation system, comprises a probability decision circuit for deciding the probability of generation of a specific demodulated data code combination, and a carrier regeneration circuit which maintains the phase ambiguity of the regenerated carrier within a multiple of 90°, by controlling, in response to the output of said probability decision circuit, whether the phase of the regenerated carrier is shifted by 45° or not.

BRIEF DESCRIPTION OF THE DRAWINGS

FIGS. 2a to 2c and 3a to 3c are waveforms and vector diagrams for explaining the operations of the system of FIG. 1;

FIG. 4 is a block diagram of the modulator of FIG. 1;

DESCRIPTION OF THE PREFERRED EMBODIMENTS

Figure 1:
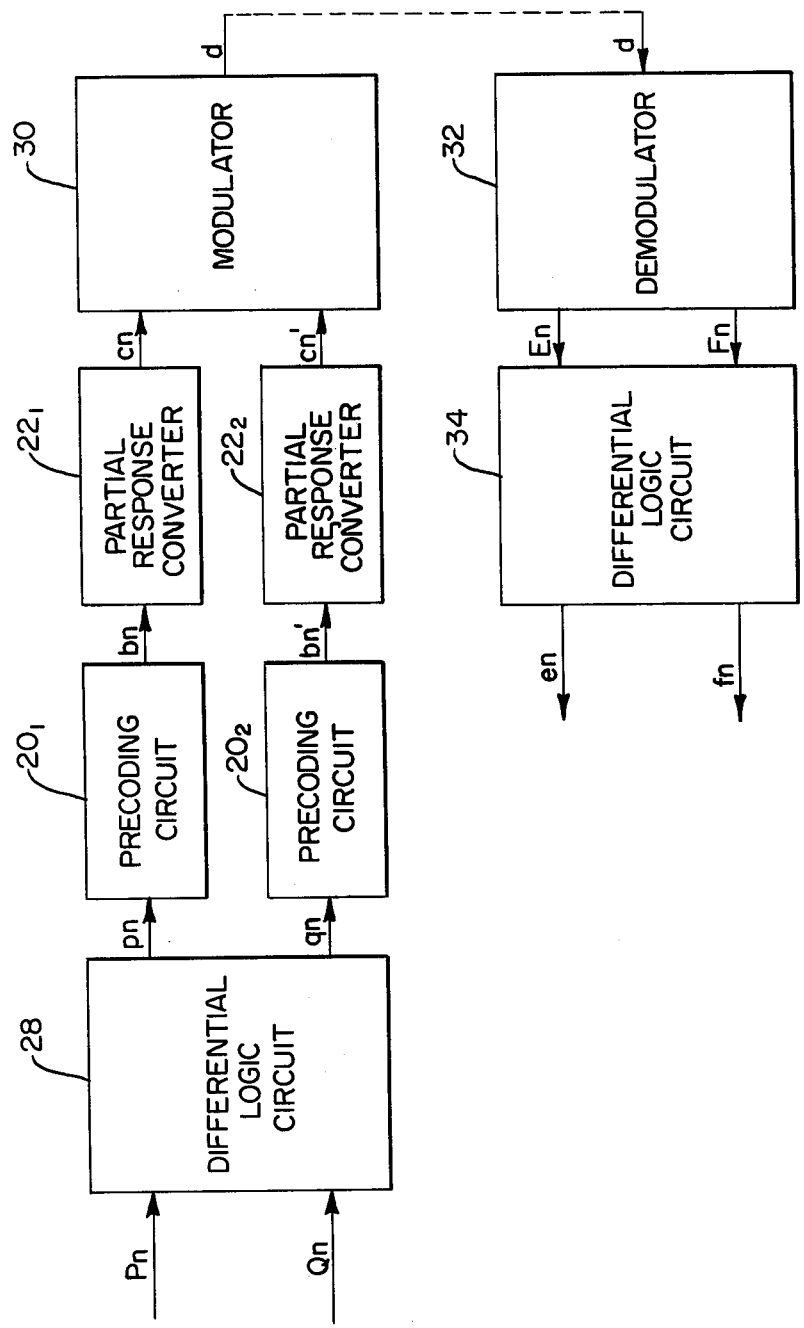
FIG. 1 is a block diagram of transmitter/receiver portions of a quadrature partial response modulation system related to the present invention.

FIG. 1 is a block diagram of portions of the transmitter and receiver of a quadrature partial response modulation system related to the present invention. The carrier regeneration circuit of the present invention relates to the configuration of the demodulator 32 in FIG. 1. However, the partial response system of the invention will be explained first.

In FIG. 1, the input digital signals for transmission are supplied in code combinations as the two parallel input signals $P_n$, $Q_n$. The input signals $P_n$, $Q_n$ are applied to the differential logic circuit 28 which performs logic processing such that when the code combination of the input signals $P_n$ and $Q_n$ is (1,1) or (0,0), the signals are supplied directly to the corresponding precoding circuits $20_1$, $20_2$; when (0,1), the preceding transmitting vector position is maintained; and when (1,0), the differential logic changes the phase by 90° (±90°) from the preceding transmitting vector position, and then the input signals (1,0) are applied to the precoding circuits $20_1$, $20_1$. The aforementioned "preceding transmitting vector" moreover is defined to be that previous vector (i.e., it is formed by retracing up to the vector) corresponding to the next preceding (1,0) or (0,1) signals, skipping any intervening vector corresponding to (0,0) or (1,1) signals which may exist just before (i.e., prior to) the relevant transmitting vector.

In case of the class 1 partial response system, the precoding circuits $20_1$, $20_2$ perform a code conversion according to the following logic equations:

$$b_n = p_n \oplus b_{n-1} \tag{1}$$

$$b_n' = q_n \oplus b'_{n-1} \tag{2}$$

and the output signals $b_n$, $b_n'$ are applied to the partial response converters $22_1$, $22_2$. There, the conversions as shown by the following equations are carried out.

$$c_n = b_n + b_{n-1} \tag{3}$$

$$c_n' = b_n' + b_{n-1}' \tag{4}$$

Therefore, for example, in the case of the input signals $p_n$, $q_n$ of the precoding circuits $20_1$, $20_2$ as are shown in FIG. 2(a), the outputs of the preceding circuits $20_1$, $20_2$ become those as shown in FIG. 2(b), and these outputs then are converted by the partial response converters $22_1$, $22_2$ to the 3-level signals $c_n$, $c'_n$, as shown in FIG. 2(c).

Quadrature amplitude modulation is performed by the modulator 30 on the correspondence of this 3-level signal between "1" level and 0V, "0" level and $-eV$, and "2" level and $+eV$. Thereafter, the modulated signal is transmitted.

In the receiving side, the carrier is regenerated at the demodulator 32, synchronous demodulation is performed by the regenerated, quadrature-related carriers (i.e., having a phase difference of 90° between them), the demodulated output is full wave rectified, and level recognition for "1" and "0" then is carried out. Thereby, the signals $E_n$, $F_n$ similar to the input signals to the precoding circuits $20_1$, $20_2$ in the transmitting side are generated, and supplied as inputs to the differential logic circuit 34 of the receiver.

The differential logic circuit 34 comprises receiving differential logic for generating the output signals $e_n$, $f_n$ as follows: if the input signals (demodulated signals) $E_n$ and $F_n$ are (1,1) or (0,0), they are directly output; and if (0,1) or (1,0), they are compared with the combination, $E_{n-1}$, $F_{n-1}$ corresponding to the preceding received signal vector. Then, if the result is the same, (0,1) is output, while if different, (1,0) is output.

In this case also, the "preceding receiving vector" shall be defined as (and, thus, formed by retracing up to) the vector corresponding to the next preceding (1,0) or (0,1) signals, skipping any intervening vector corresponding to (0,0) or (1,1) signals which may exist just before (i.e., prior to) the relevant receiving vector.

In the modulator 30, for example, the modulation vector for the input signal $P_n$ takes one of the three positions 1, 2 and 3 for the 3 levels as shown in FIG. 3(a), while the modulation vector for the input signal $Q_n$ takes one of the three positions 4, 5 and 6 for the 3 levels as shown in FIG. 3(b). Therefore, vectors of the quadrature amplitude modulated signal have one of the nine states (i.e., positions or values) 1 to 9 as shown in FIG. 3(c). Namely, the phase relation resembles that of an 8-phase PSK (Phase Shift Keying) signal.

The transmitting logic of the foregoing orthogonal amplitude modulation is shown in the following logic truth table, Table 1:

Table 1

| $p_{n-1}$ | $q_{n-1}$ | $P_n$ | $Q_n$ | $p_n$ | $q_n$ | Vector |
|---|---|---|---|---|---|---|
| — | — | 0 | 0 | 0 | 0 | ②,④,⑥,⑧ |
| — | — | 1 | 1 | 1 | 1 | ⑨ |
| 0 | 1 | 0 | 1 | 0 | 1 | ①,⑤ |
| 0 | 1 | 1 | 0 | 1 | 0 | ①,⑤→③,⑦ |
| 1 | 0 | 0 | 1 | 1 | 0 | ③,⑦ |
| 1 | 0 | 1 | 0 | 0 | 1 | ③,⑦→①,⑤ |

When $P_n \oplus Q_n = 1$, the logic equations of the transmitting logic become:

$$p_n = p_{n-1} \cdot \overline{q}_{n-1} \cdot \overline{P}_n \cdot Q_n + \overline{p}_{n-1} \cdot q_{n-1} \cdot P_n \cdot \overline{Q}_n \tag{5}$$

$$q_n = p_{n-1} \cdot \overline{q}_{n-1} \cdot P_n \cdot \overline{Q}_n + \overline{p}_{n-1} \cdot q_{n-1} \cdot \overline{P}_n \cdot Q_n \tag{6}$$

where $p_{n-1}$ and $q_{n-1}$ may be any bit code combination, except for (1,1) and (0,0) which next precedes $p_n$, $q_n$ and the vector of which is considered as the "preceding vector". 1, 5 →3, 7 and 3, 7→1, 5 means the inversion of that vector by the differential logic.

When it is supposed that the phase ambiguity of the regenerated carrier is a multiple of 90° and the phase vector takes any of 1, 3, 5 and 7 as shown in FIG. 3(c), the receiving logic becomes that shown in the truth table, Table 2:

Table 2

| $E_{n-1}$ | $F_{n-1}$ | $E_n$ | $F_n$ | $e_n$ | $f_n$ |
|---|---|---|---|---|---|
| — | — | 0 | 0 | 0 | 0 |
| — | — | 1 | 1 | 1 | 1 |
| 0 | 1 | 1 | 0 | 1 | 0 |
| 0 | 1 | 0 | 1 | 0 | 1 |
| 1 | 0 | 1 | 0 | 0 | 1 |
| 1 | 0 | 0 | 1 | 1 | 0 |

When $E_n \oplus F_n = 1$, relations of equation (7) and (8) can be obtained.

$$e_n = E_n \cdot F_{n-1} \cdot \overline{E}_{n-1} \cdot \overline{F}_n + E_{n-1} \cdot \overline{F}_{n-1} \cdot \overline{E}_n \cdot F_n \tag{7}$$

$$f_n = E_{n-1} \cdot \overline{F}_{n-1} \cdot E_n \cdot \overline{F}_n + \overline{E}_{n-1} \cdot F_{n-1} \cdot \overline{E}_n \cdot F_n \tag{8}$$

In Table 2 above, when $E_n$, $F_n$ are (0,1) or (1,0), the outputs $e_n$, $f_n$ are determined by the differential logic between $E_n$, $F_n$ and $E_{n-1}$, $F_{n-1}$. Therefore, if $E_{n-1}$ and $F_{n-1}$ are inverted due to the phase ambiguity of 90°, $E_n$ and $F_n$ are also inverted resulting in correct $e_n$ and $f_n$. Thus, demodulation can be performed without adverse influence from the phase ambiguity of 90°.

As mentioned above, demodulation can be performed correctly even with a 90° phase ambiguity, where the vector of the regenerated carrier takes any of the vectors 1, 3, 5 and 7 shown in FIG. 3(c). However, as shown in FIG. 3(c), since the phase relation is the same as in the case of 8-phase PSK, the phase ambiguity becomes 45° when carrier regeneration is performed by a carrier regenerating circuit as used for 8-phase PSK. For example, when vector of the carrier is any of 2, 4, 6 and 8 shown in FIG. 3(c), it does not comply with the receiving logic of Table 2. Therefore, it is necessary to recognize whether the phase of the regenerated carrier is represented by an even vector or an odd vector in FIG. 3(c).

There are two recognition methods: one is to detect the difference of peak values between the odd vector and the even vector and the other is to utilize the fact that there is a difference between the probabilities where the vector of the modulated signal assumes an even vector or conversely, an odd vector. In the case of the present invention, the latter method, i.e., the probability decision method, is employed. A vector takes the state shown by the even numbers in FIG. 3(c) only when the vector shown in FIG. 3(a) is 1 or 3 and the vector shown in FIG. 3(b) is 4 or 6. When the vector shown in FIG. 3(a) is 2 and that shown in FIG. 3(b) is 4 or 6, or when the vector shown in FIG. 3(a) is 1 or 3 and that shown in FIG. 3(b) is 5, the vector shown in FIG. 3(c) takes a state shown by one of the odd numbers.

The vectors of FIG. 3(a) and 3(b) correspond to the independent inputs $P_n$ and $Q_n$. There is an equal probability of 1 and 4, 2 and 5, 3 and 6, and the probability that the vectors 1, 2 and 3 in FIG. 3(a) are taken is equal to the probability that each level of the output signal $c_n$ (refer to FIG. 1) appears when the occurrence of the bit values "1" and "0" of the input signal $P_n$ are the same in number. Correspondence between this input signal $P_n$ and the output signal $c_n$ can be shown in the form of the logic truth Table 3.

Since the relation between the input signal $Q_n$ and the output signal $c_n'$ is the same as above, an explanation will be given hereunder for only $P_n$.

Table 3

| $P_n$ | $b_{n-1}$ | $b_n$ | $e_n$ | Vector | probability |
|---|---|---|---|---|---|
| 0 | 0 | 0 | 0 | 1 | ¼ |
| 0 | 1 | 1 | 2 | 3 | ½ |
| 1 | 0 | 1 | 1 | 2 | ¼ |
| 1 | 1 | 0 | 1 | 2 | ½ |

From Table 3, the probability of the vectors 1, 2 and 3 in FIG. 3(a) is ¼, ½ and ¼, respectively.

Therefore, the probability that each vector position shown in FIG. 3(c) is taken becomes that shown in Table 4:

Table 4

| Vector | ① | ② | ③ | ④ | ⑤ | ⑥ | ⑦ | ⑧ | ⑨ |
|---|---|---|---|---|---|---|---|---|---|
| probability | 1/8 | 1/16 | 1/8 | 1/16 | 1/8 | 1/16 | 1/8 | 1/16 | 1/4 |

From Table 4, the probability that an even vector is taken is $1/16 \times 4 = ¼$ and the probability that an odd vector, except for the vector position 9, is taken becomes $⅛ \times 4 = ½$.

In the data transmission system, input data is randomized by a scrambler; thus, the peak power is suppressed and at the same time the signal spectrum is distributed. Therefore, the probability of the vector position of the modulated signal as received at the receiver becomes as described above.

As mentioned above, attention is focused on the difference between the probability of the even and odd vector positions; the phase ambiguity of regenerated carrier is kept to a multiple of 90° by shifting the phase of regenerated carrier by 45° when the detected probability is low.

FIG. 4 is a block diagram of the modulator 30 in FIG. 1.

The carrier from the carrier generator 36 is directly applied as the signal $c_n$ to a first ring modulator 38 and via the $\pi/2$ phase shifter as the signal $c_n'$ to the other ring modulator 40. Thus, the carrier is modulated by the outputs $c_n$, $c_n'$ from the partial response converters $22_1$ and $22_2$ at the ring modulators 38 and 40, respectively. At this time, since the outputs of the partial response converters $22_1$ and $22_2$ take the three levels of "0", "1" and "2" as shown in FIG. 3(c), the quadrature amplitude modulation is carried out on the correspondence, for example, between "0" level and $+eV$, "1" level and 0V, "2" level and $-eV$.

Therefore, the output vectors of the ring modulators 38, 40 take respectively three states or vector values, of 1 to 3 and 4 to 6 as indicated in FIG. 3(a) and (b) for the in-phase and quadrature channels, respectively. As a result, the output d of the hybrid circuit 44 comprises 9 vector values, or states of 1 to 9 as shown in FIG. 3(c) as the QAM signal.

Figure 5:
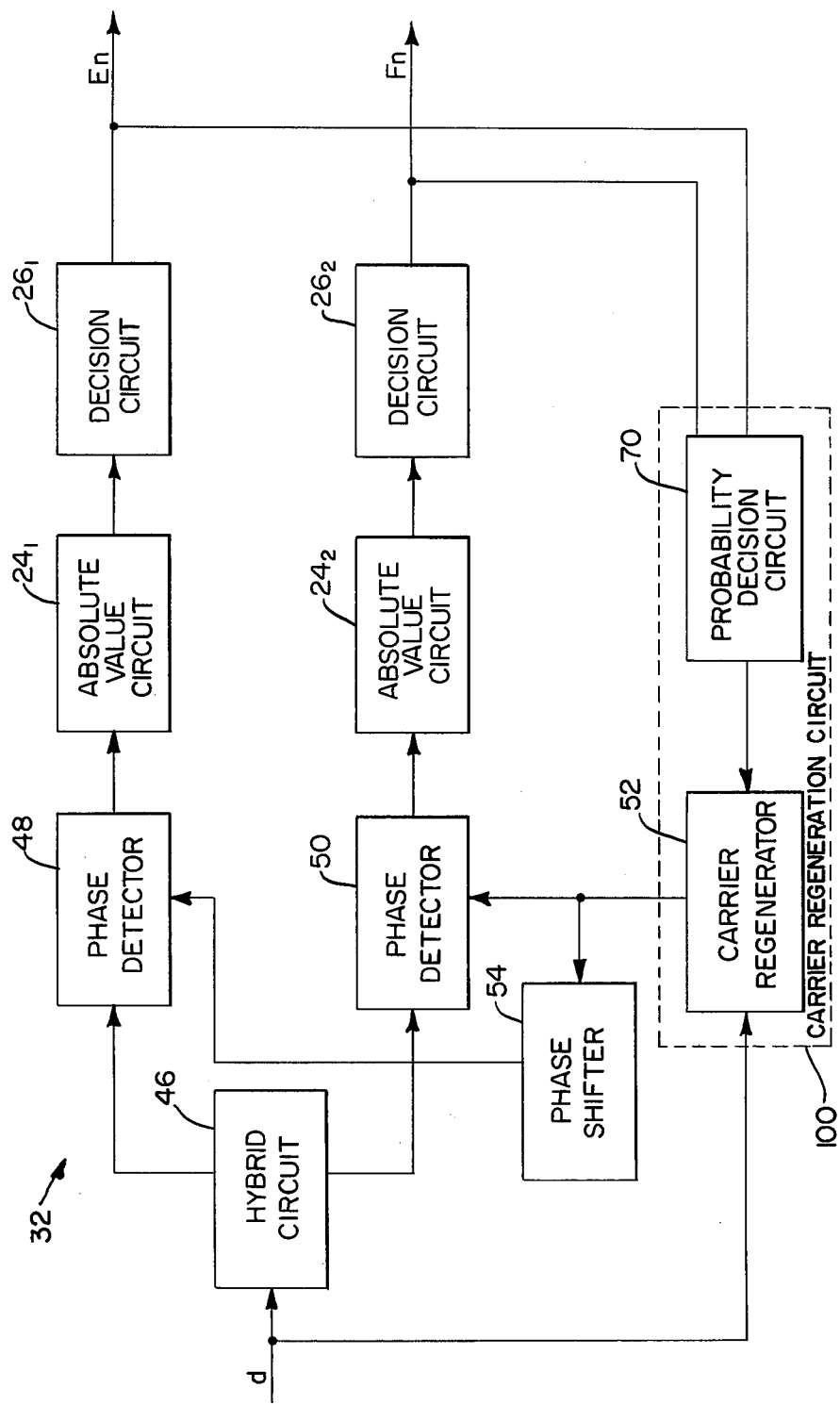
FIG. 5 is a block diagram of the demodulator 32 of FIG. 1, including a carrier regeneration circuit 100 in accordance with one embodiment of the present invention.

FIG. 5 is a block diagram of the demodulator 32 including the carrier regeneration circuit 100 in accordance with the embodiment of the present invention.

In FIG. 5, 46 denotes hybrid circuit; 48, 50 are phase detectors; $24_1$, $24_2$ are absolute value circuits performing a type of full wave rectification; $26_1$, $26_2$ are level decision circuits which decide whether the signal is of the level "1" or "0" by comparing same with specified threshold levels; 54 is a 90° ($\pi/2$) phase shifter; 52 is a carrier regenerator circuit; and 70 is a probability decision circuit.

The carrier regeneration circuit 100 is composed of the probability decision circuit 70 and the carrier regenerator circuit 52.

The quadrature partial response modulated signal d is respectively applied to the phase detectors 48, 50 via the hybrid circuit 46. Then, the carrier regenerated at the carrier regenerator circuit 52 is applied directly to phase detector 50 or via the phase shifter 54 to the phase detector 48, whereby synchronous detection (demodulation) is carried out; the resulting output has three levels as described above. Full wave rectification is performed by the absolute value circuits $24_1$ and $24_2$ and a decision as to "1" and "0" levels of the received signal is performed by the decision circuits $26_1$ and $26_2$. The outputs of the decision circuits then are applied to the probability decision circuit 70. According to the result, or output, of the probability decision circuit 70, the carrier regenerator circuit 52 is controlled in accordance with whether the phase of the regenerated carrier is kept as it is or shifted by 45°.

For example, if the phase of the regenerated carrier is in an odd vector position, except for 9 in FIG. 3(c), the demodulated data becomes any of (0, 1), (1, 0), (1, 1) when the vector of the input modulated signal is in the odd vector position, and the demodulated data becomes (0, 0) when the input modulated signal vector is in the even vector position. If the phase of regenerated carrier is in an even vector position in FIG. 3(c), the demodulated data becomes (1, 1) in case of vector 9 or (0, 0) in case of any other position when the input modulated signal vector is in the odd vector position. When the input modulated signal vector is in the even vector position, the demodulated data becomes (0, 1) or (1, 0).

Demodulated data $E_n$, $F_n$ in such relation is applied to the NOR circuit NOR 1 in the probability decision circuit 70 (FIG. 6), and only when the demodulated data is (0, 0), the output becomes "1"; in any other case, the output becomes "0". This means that the vector position of the modulated signal, corresponding to the case where the output of the NOR 1 circuit is "1", is in the relation of 45° ± g.90° (g: an integer) to the vector position of the regenerated carrier. When the phase of the regenerated carrier is in the odd vector position, if the input modulated signal phase is in the even vector position, the output of the NOR 1 circuit becomes "1", and when the phase of regenerated carrier is in the even vector position, if the input modulated signal phase is in the odd vector position, the output of the NOR 1 circuit becomes "1".

Since the probability that the vector of the modulated signal takes, or has, an even position differs from the probability that it takes an odd position, the phase of the regenerated carrier can be detected by detecting the probability that the output of the NOR 1 circuit becomes "1".

The output of the NOR 1 circuit is integrated by the integrating integral circuit 72 and the output of the integrating circuit attains a DC voltage, for example 0.25V, when the vector of the regenerated carrier is in the odd vector position, corresponding to a ¼ probability of a "1" output of the NOR 1 circuit. When the vector of the regenerated carrier is in the even position, the probability of a "1" output of the NOR 1 circuit is ½ and therefore, a DC output of 0.5V can be attained. FIGS. 7(a) to 7(d) show such relations between the output of the NOR 1 circuit and that of the integrating circuit 72. The 0.5V output of the integrating circuit 72, for example, may result in a "1" being applied to the carrier regenerator circuit 52 under the condition of FIG. 7(b) or alternatively, a "0" under the condition of FIG. 7(d), by the probability decision circuit, and when the output thereof is "1", the carrier regenerator circuit 52 performs phase shifting of the regenerated carrier by 45°.

Figure 6:
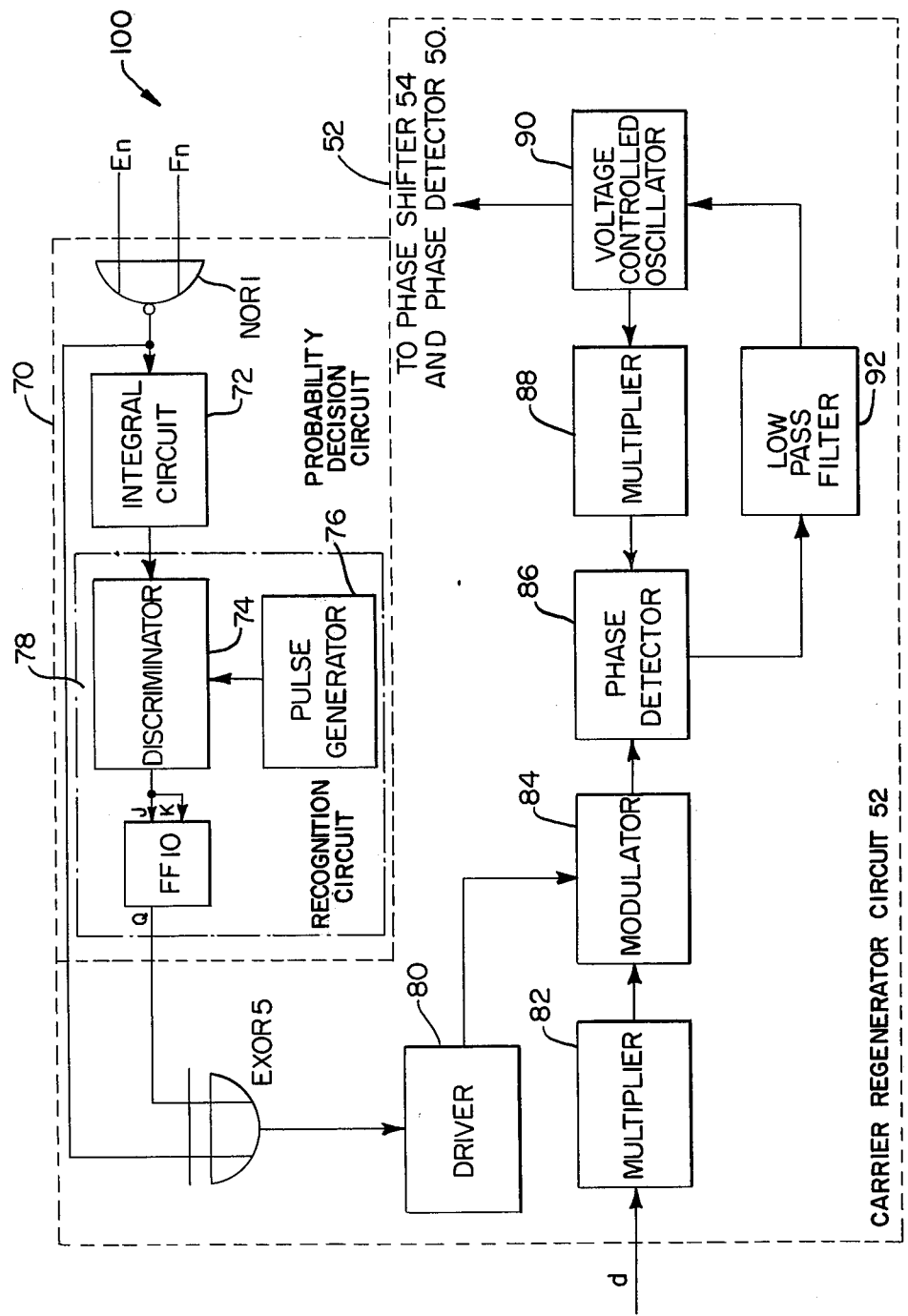
FIG. 6 is a more detailed block diagram of the carrier regeneration circuit 100 of the present invention.
Figure 7:
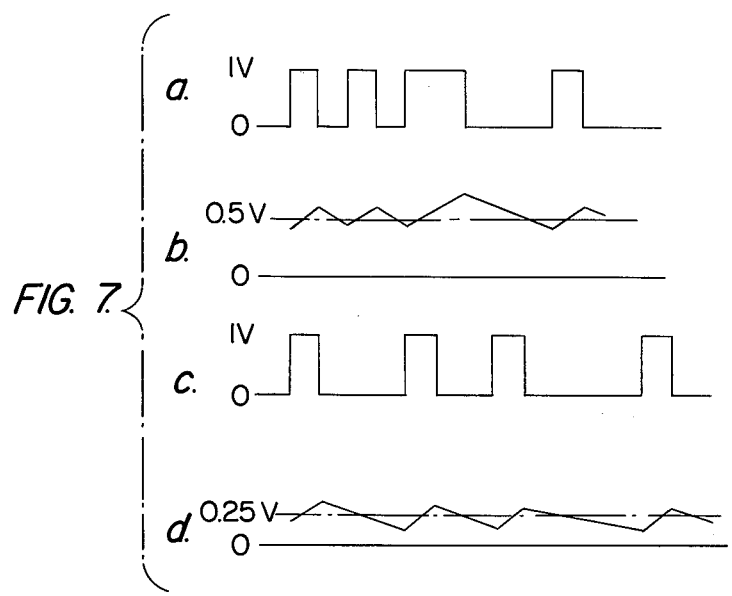
FIGS. 7a to 7d are waveforms provided for explaining operations of the circuit of FIG. 6.

FIG. 6 shows a block diagram of an embodiment of the present invention concerning the circuit 52 for regenerating the carrier, by a combined multiplication and inverse modulation system. The carrier regenerator circuit 52 comprises multipliers 82, 88 which multiply by a factor of 4; modulator 84, phase detector 86, exclusive OR circuit EXOR 5, driver 80, low pass filter 92 and voltage controlled oscillator 90. The QAM modulated signal $d$ is multiplied by 4 by the multiplier 82 and then converted into a 2-phase signal and finally applied to the modulator 84. The phase detector 86, multiplier 88, voltage controlled oscillator 90, and low pass filter 92 form the phase synchronization circuit or phase lock loop (PLL), and the output of the voltage controlled oscillator 90 is applied to the phase detector 50 and the phase shifter 54 (FIG. 5).

The probability decision circuit 70 (FIG. 6) is composed of the NOR circuit NOR 1, integrating circuit 72 and recognition circuit 78, while the recognition circuit 78 includes a discriminator circuit 74, a flip-flop circuit FF 10 and a pulse generator 76. The output of the NOR circuit NOR 1 and that of flip-flop circuit FF10 are supplied to the exclusive OR circuit EXOR 5. The output thereof is then applied to the modulator 84 via the driver 80. The output phase of the modulator 84 is changed by 180° according to the output of the exclusive OR circuit EXOR 5. On the other hand, the output of the voltage controlled oscillator 90 is multiplied by 4, by the multiplier 88, and compared as to phase with that of the output of modulator 84 by the phase detector 86. The output frequency of the voltage controlled oscillator 90 is ¼ that of the modulator 84; thus, a phase variation of 180° of the modulator 84 corresponds to a phase variation of 45° in terms of the output of the voltage controlled oscillator 90. Namely, the phase of regenerated carrier can be changed by 45° under control of the output of the probability decision circuit 70.

Discriminator circuit 74 of the probability decision circuit 70 outputs a "1" when the output level of the integrating circuit 72 is 0.5V in the abovementioned example, or "0" when it is 0.25V. Namely, it outputs "0" when the phase of regenerated carrier is in the correct position, or a "1" when the phase is in the wrong position. The flip flop circuit FF10 has the function of inverting its output only when the output of the discriminator circuit 74 changes from "0" to "1".

Thereby, if the phase of the regenerated carrier varies by 45° from the correct phase, output level of the discriminator circuit 74 changes from "0" to "1" and, as a result of it, the output of flip-flop FF10 is inverted. Since the phase of the regenerated carrier is changed by 45° when the output of flip-flop FF10 is inverted, the phase of the carrier is adjusted to the correct phase. When the phase of the carrier is returned, or adjusted, to the correct one, the output level of the discriminator circuit 74 changes from "1" to "0". But at this time, the output of the flip-flop FF10 does not change and thus the correct phase is maintained.

If the output of the discriminator circuit 74 changes from "0" to "1" due to noise, in spite of the phase of carrier being in the correct position; the output of the flip-flop circuit FF10 is thereby inverted and the phase of the carrier is changed by 45° from the correct position; thereafter, the output of the discriminator circuit 74 is maintained at "1". Therefore, once the above operation is performed erroneously, the phase of the regenerated carrier is not returned to the correct position. In order to avoid such a defect, or disadvantage, the pulse generator 76 generates continuously a train of pulses having a narrow pulse width, and a lower rate than the signal speed. This pulse forces the output of the discriminator circuit 74 to "0" for the duration of the pulse width, irrespective of the voltage from the integrating circuit 72; at times other than during the pulse width duration, the output corresponding to the voltage from the integrating circuit 72 is obtained as the output from the discriminator circuit 74. After the output of the discriminator circuit 74 is forced to 37 0", if the phase of regenerated carrier is in the correct position, the output remains at "0", and thus does not change; however, if the phase differs by 45° from the correct phase, it does change to "1". Since the output of flip-flop FF10 is inverted in response to the output of the discriminator circuit 74 changing from "0" to "1", the phase of the regenerated carrier correspondingly is changed by 45° and thus returns to the correct phase.

By periodically driving or forcing the output of the discriminator circuit 74 to "0" as described above, the pull-in or locking-in of the phase of the regenerated carrier is checked periodically, and thus the phase is returned to the correct one.

Figure 8:
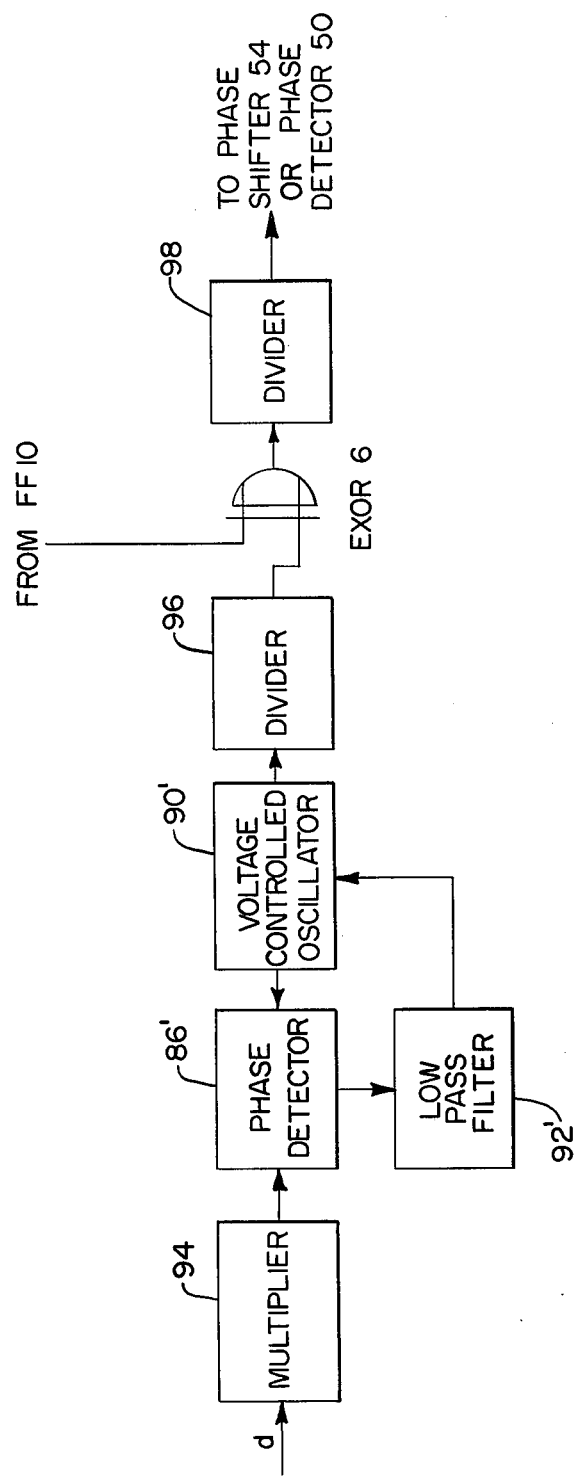
FIG. 8 is a block diagram of another embodiment of the carrier regenerator circuit 52.

FIG. 8 is a block diagram of the carrier regenerator circuit 52 is accordance with an alternative embodiment of the present invention, for regenerating the carrier by means of a frequency multiplication and division method. Since the QAM signal $d$ is the quadrature partial response modulation signal modulated by the phase of $\pi/4$ as mentioned above, a phase coherent signal can be obtained by multiplying the signal $d$ by a factor of 8 by the multiplier 94. The resulting signal then is compared as to phase with the output of the voltage controlled oscillator 90' by the phase detector 86'. The comparison output then is applied via the low-pass-filter 92' as a control signal for the voltage controlled oscillator 90'.

The output of voltage controlled oscillator 90' is divided by 2 (multiplied by $\frac{1}{2}$) by the divider 96 and then the resulting divided output and the output of the probability decision circuit 70, namely, the output of the flip-flop FF10 (FIG. 6) are applied to the exclusive OR circuit EXOR 6. When the output of the probability decision circuit 70 (FF10) is "0", the output of the divider 96 is directly applied to the divider 98 which divides it by 4 (i.e., multiplies by $\frac{1}{4}$). Therefore, the output of the voltage controlled oscillator 90' is divided by a total factor of 8, through dividers 96 and 98 for supply either directly to phase detector 50 or via phase shifter 54 to phase detector 48 (FIG. 5). (Recall again that the input QAM signal $d$ is multiplied by 8 by multiplier 94 for supply to phase detector 86' for comparison with the output of oscillator 90' by phase detector 86' and the output thereof controls the phase of V.C.O. 90'.) Thus, the carrier is regenerated.

When the output of the flip-flop FF10 is "1", the output of the exclusive OR circuit EXOR 6 inverts the output phase of the divider 96. Therefore, a phase shift of 45° is performed by dividing the thus inverted output of divider 96 by 4, by the divider 98.

Figure 9:
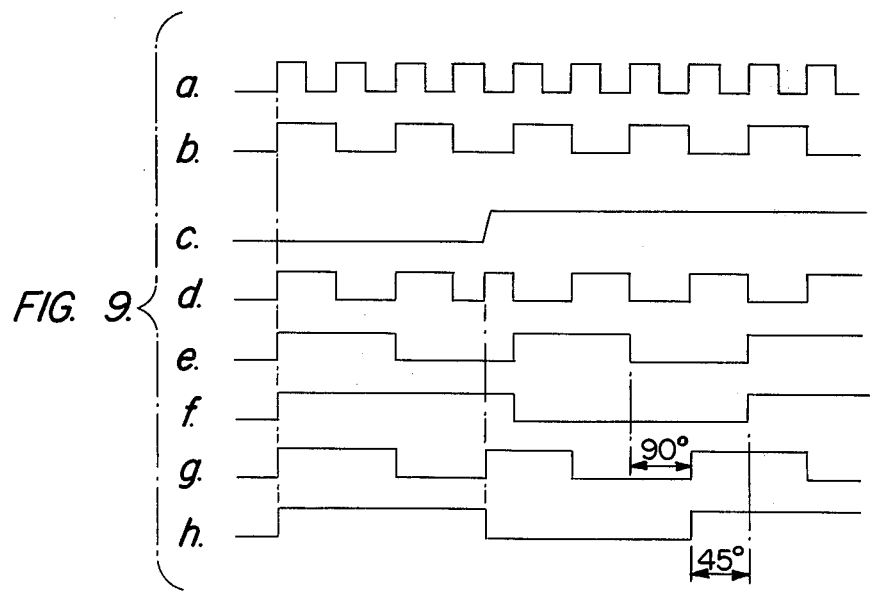
FIGS. 9a to 9h are waveforms provided for explaining the operation of the embodiment of FIG. 8.

FIGS. 9(a) to 9(h) are the waveforms for explaining the operation of FIG. 8. FIG. 9(a) shows the output of the voltage controlled oscillator 90', FIG. 9(b) shows the output of the divider 96 and FIG. 9(c) shows the output of the flip-flop circuit FF10. When this output is "0", the output of the exclusive OR circuit EXOR 6 is the same as its input signal from divider 96, shown in FIG. 9(b). When the FIG. 9(b) waveform is further divided by 2, the waveform shown in FIG. 9(e) results, and when the latter is further divided by 2, the waveform shown in FIG. 9(f) results. In other words, by dividing the output of voltage controlled oscillator 90' by 8, by the dividers 96 and 98, the waveform shown in FIG. 9(f) is obtained.

When the output of flip-flop FF10 changes from "0" to "1", as shown in FIG. 9(c), the waveform as shown in FIG. 9(d) is obtained as the output of the exclusive OR circuit EXOR 6. When this is divided by 2, the waveform of FIG. 9(g) results; and when the latter is further divided by 2, the waveform of FIG. 9(h) is obtained. Namely, the output of the exclusive OR circuit EXOR 6 changes by 180° according to changes in the "0" or "1" state of the output of the flip-flop circuit FF10. When the output of EXOR 6 is divided by 2, the output phase changes 90° and when further divided by 2, the phase changes 45°, as shown in FIGS. 9(g) and 9(h), respectively. Therefore, the phase ambiguity of the regenerated carrier can be limited to a multiple of 90°.

Figure 10:
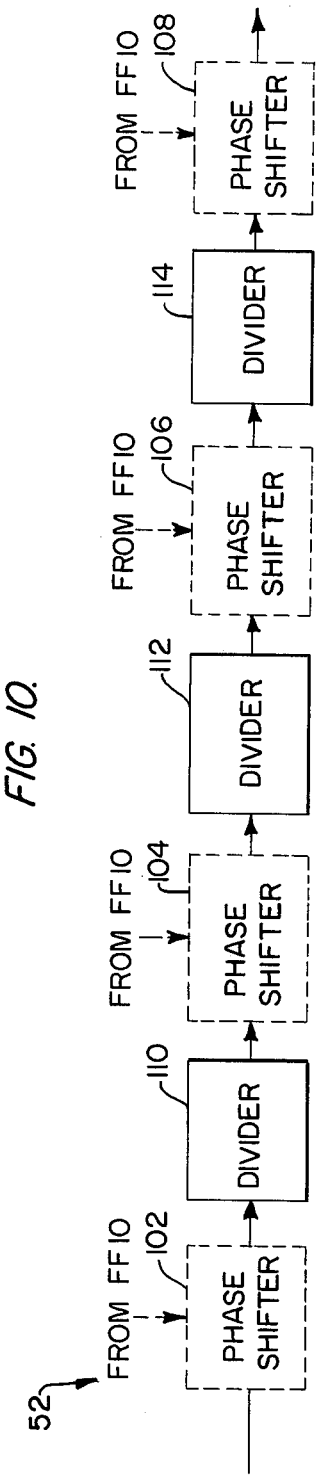
FIG. 10 is a block diagram of another embodiment of the carrier regenerator circuit 52.

FIG. 10 shows another embodiment for providing division and phase shift of the output of the voltage controlled oscillator (V.C.O) 90 (FIG. 6) of the carrier regenerator circuit 52. In FIG. 10, 110, 112 and 114 each denote a $\div$ 2 divider; 102, a 360° phase shifter; 104, a 180° phase shifter; 106, a 90° phase shifter; and 180, a 45° phase shifter. Only one phase shifter is provided in an actual circuit, and hence the phase shifters 102, 104, 106 and 108 are shown in dotted lines. Their respective capabilities, or functions, are described hereinafter. For example the 360° phase shifter is capable of shifting the phase by forcing its output to "0" during a period of 360°. Each phase shifter is controlled by the output of the probability decision circuit 70, namely, the output of the flip-flop FF10. Therefore, when the phase shifter 104 is used, a phase shift of 45° is performed in substantially the same manner as described above, as to EXOR 6. When the 90° phase shifter 106 is used, a phase shift of 45° is performed by dividing its output frequency by 2, by the divider 114. In other words, the control as to whether or not the phase of the regenerated carrier is to be shifted by 45° is provided by the output of the flip-flop circuit FF10. Thus, if the vector of the regenerated carrier is in an odd position, for example, as in FIG. 3(c), the phase ambiguity becomes 90°.

Figure 11:
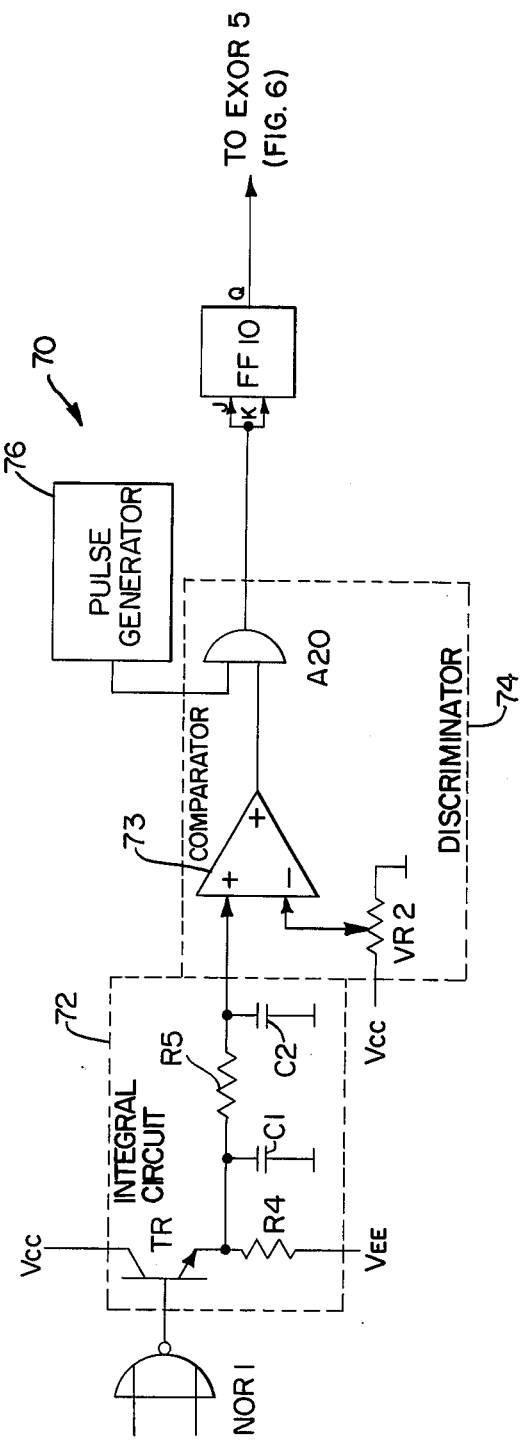
FIG. 11 is a circuit diagram of the embodiment of the probability decision circuit 70 of FIG. 6.

FIG. 11 is a detailed circuit schematic of the probability decision circuit 70 of FIG. 6. The integrating (integral) circuit 72 comprises the transistor TR, resistors R4, R5 and capacitors C1, C2. $V_{cc}$, $V_{EE}$ respectively are positive and negative power supply voltages. The transistor TR and the resistor R4 form an emitter follower circuit for the purpose of impedance conversion. In addition, the resistor R5 and capacitors $C_1$, $C_2$ form a smoothing filter (integrator). The discriminator circuit 74 comprises a comparator 73, variable resistor VR 2 and AND circuit A 20. $V_{CC}$ is the power supply. The pulse generator 76 may comprise an astable multi-vibrator.

Figure 12:
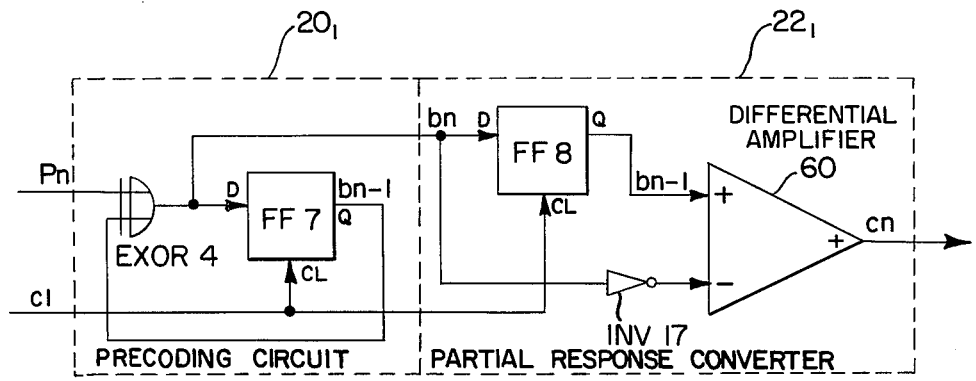
FIG. 12 is a circuit diagram of the embodiment of the precoding circuit 20, and partial response converter 22, of FIG. 1.

FIG. 12 is a detailed logic circuit diagram of the precoding circuit $20_1$ and the partial response converter $22_1$ of FIG. 1. The configuration of the precoding circuit $20_2$ and of the partial response converter $22_2$ in FIG. 1 are exactly the same as these respective configurations of $20_1$ and $22_1$ of FIG. 12.

In FIG. 12, the exclusive OR circuit EXOR 4 and the flip-flop circuit FF7 form the precoding circuit $20_1$ which outputs $b_n$ by performing the logic conversion function of $b_n = p_n \oplus b_{n-1}$ for the input signal $p_n$.

The flip-flop FF8, inverter INV 17, and differential amplifier 60 form the class 1 partial response converter $22_1$. This circuit executes the conversion of $c_n = b_n \oplus b_{n-1}$ and provides an output $c_n$. The input signal $b_n$ is inverted by the inverter INV 17 and supplied to the inverting terminal of the differential amplifier as the signal $\bar{b}_n$.

Figure 13:
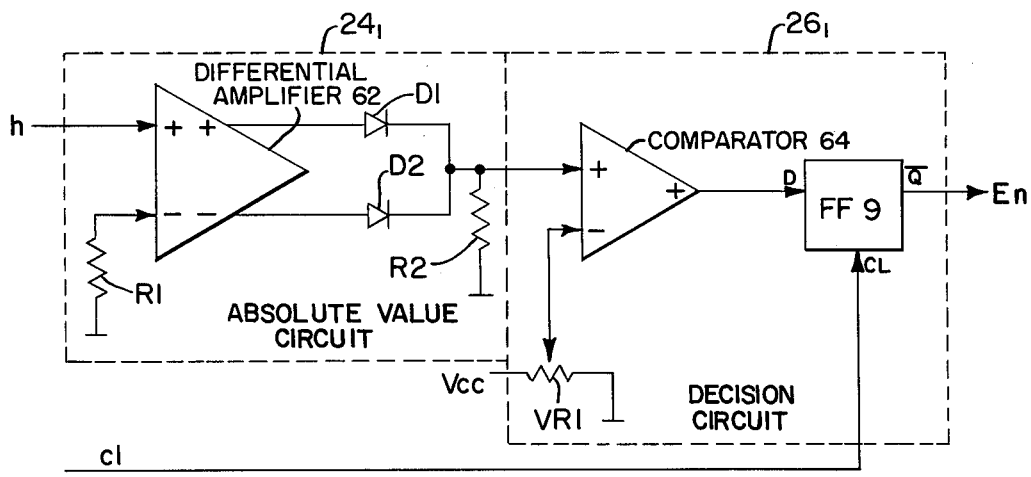
FIG. 13 is a circuit diagram of an embodiment of the absolute value circuit $24_1$ and decision circuit $26_1$ of FIG. 5.

FIG. 13 is a detailed logic circuit diagram of the absolute value circuit $24_1$ and decision circuit $26_1$ of FIG. 5. The configurations of the absolute value circuit $24_2$ and decision circuit $26_2$ of FIG. 5 are exactly the same as these circuit configurations for $24_1$ and $26_1$, respectively.

In FIG. 13, differential amplifier 62, diodes D1, D2 and resistors $24_1$, R1 and R2 form the absolute value circuit $24_1$, and this circuit full-wave-rectifies the input baseband signal $h$. The resistor R1 is the input resistor and resistor R2 is the load resistor. The output of the absolute value circuit $24_1$ is applied to the decision circuit $26_1$ which comprises comparator 64, variable resistor VR1 and flip-flop FF9. The decision circuit detects the input level and outputs $E_n$ after signal inversion. The flip-flop circuit FF9 is for reshaping the output of comparator 64 and inverting. $Vcc$ indicates the power source voltage.

Figure 14:
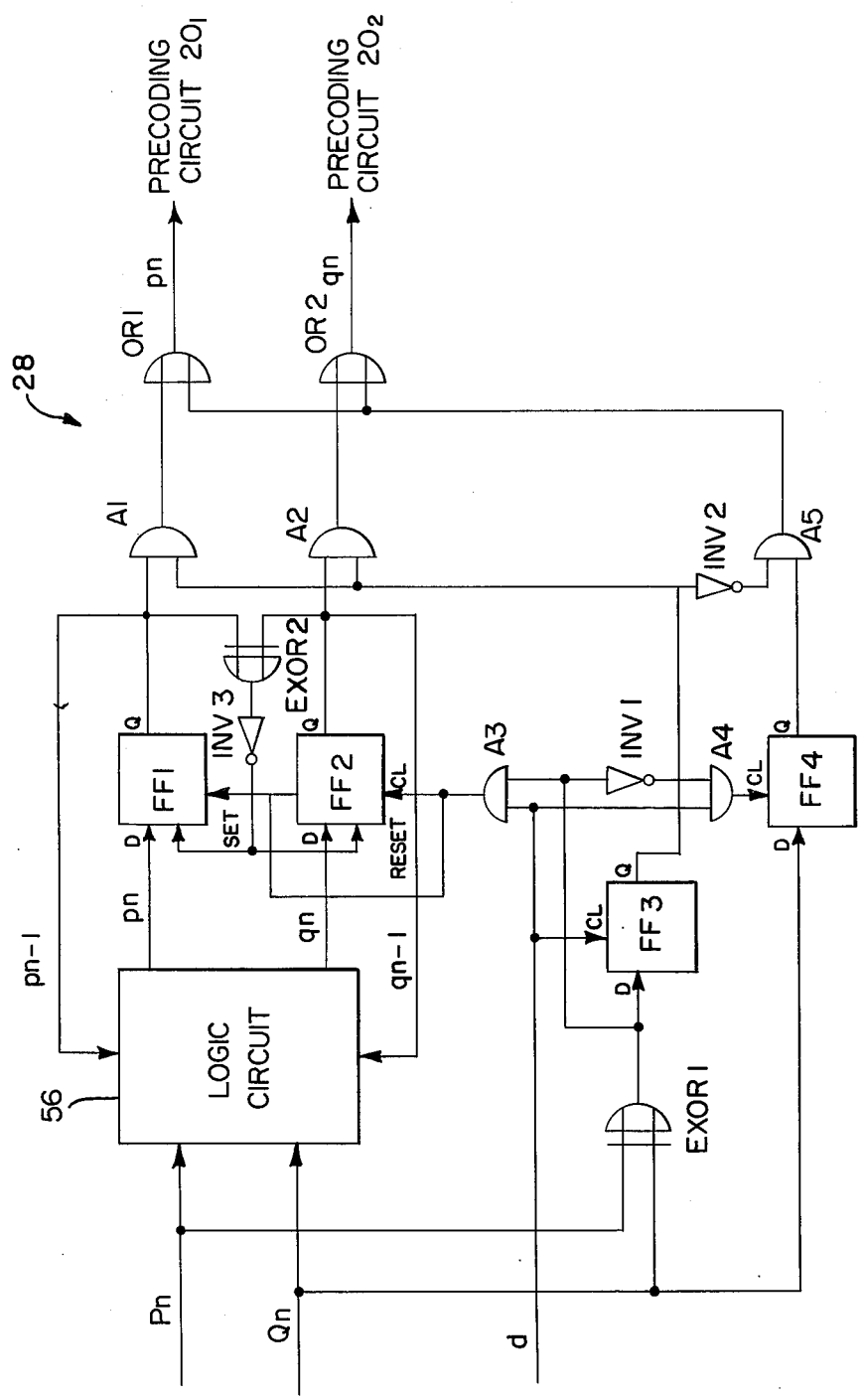
FIG. 14 is a logic block diagram of the transmitter differential logic circuit 28 of FIG. 1.

FIG. 14 is a detailed logic block diagram of the differential logic circuit 28 of the transmitter in FIG. 1. The input signals $P_n$, $Q_n$ are applied to the logic circuit 56. The logic circuit 56 performs the logic operations of equations (5) and (6) mentioned above. In an initial condition, the flip-flop circuit FF1 is set and FF2 to FF4 are reset. A1 to A5 are AND circuits, OR1 and OR2 are OR circuits, INV 1 to INV 3 are inverters, EXOR 1 and EXOR 2 are exclusive OR circuits, and $c1$ is the clock.

When the code combination of input signals $P_n$ and $Q_n$ is (0, 0) or (1, 1), the output of exclusive OR circuit EXOR 1 is "0". Therefore, the clock $c1$ is applied to the flip-flop FF4 via the AND circuit A4 and the output of flip-flop FF4 is applied to the precoding circuits $20_1$, $20_2$ via the AND circuit A5 and OR circuits OR1, OR2.

When the input signals $P_n$, $Q_n$ are (1, 0) or (0, 1), the output of exclusive OR circuit EXOR 1 becomes "1" and the clock $c1$ is applied to the flip-flops FF1 and FF2 via the AND circuit A3. Thus these circuits are set according to the outputs $p_n$, $q_n$ obtained as a result of the logic operations of equations (5) and (6) performed by the logic circuit 56. When the flip-flop FF3 is set by the clock $c1$, the outputs of the flip-flop circuits FF1, FF2 are respectively applied to the precoding circuits $20_1$, $20_2$ via the AND circuits A1, A2, and OR circuits OR1 and OR2.

The flip-flop circuits FF1 and FF2 are provided for storing the output signals $p_n$, $q_n$ of (1, 0) or (0, 1) and the exclusive OR circuit EXOR 1 is provided for applying the input signals $P_n$, $Q_n$ to the precoding circuit directly when they are (0, 0) or (1, 1) and also for maintaining the status of flip-flop circuits FF1 and FF2 unchanged. Therefore, when the input signals $P_n$ and $Q_n$ are (1, 0) or (0, 1), they can be transmitted after differential logic processing, due to the preceding relation, but not for the case of (0, 0) and (1, 1).

The outputs of the flip-flop circuits FF1 and FF2 are respectively applied to the SET and RESET terminals of the FF1 and FF2 via the exclusive OR circuit EXOR 2 and inverter INV 3. This is because the flip-flop FF1 and FF2 must be maintained or forced, to the set and reset states (1, 0), respectively, in order to eliminate erroneous operation of the differential logic circuit. This can easily occur if the flip-flop circuits FF1 and FF2 operate erroneously due to noises, resulting in a code combination output of (0, 0) or (1, 1).

Figure 15:
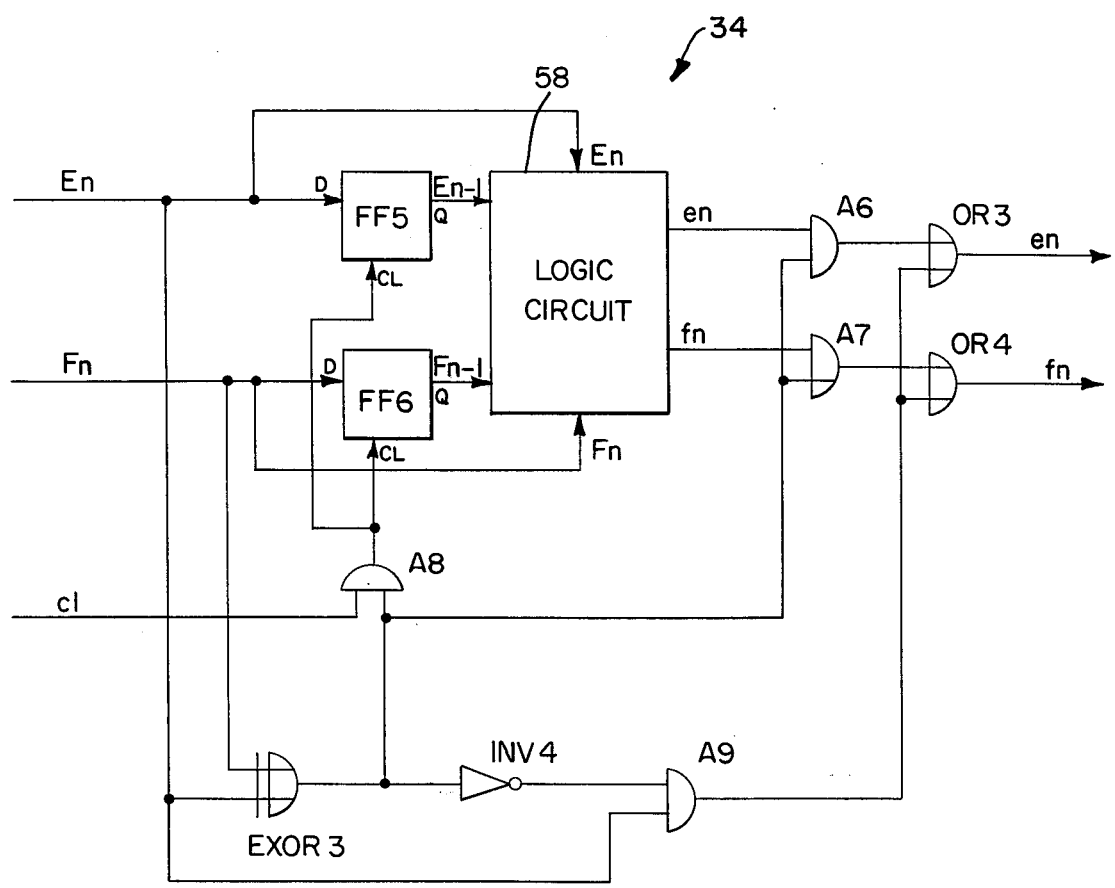
FIG. 15 is a logic block diagram of the receiver differential logic circuit 34 of FIG. 1.

FIG. 15 is a logic block diagram of the differential logic circuit 34 in the receiver of FIG. 1. In this figure, the input signals $E_n$ and $F_n$ are applied to the logic circuit 58 and flip-flop circuits FF5 and FF6, respectively.

The logic circuit 58 performs the logic operation of the equations (7) and (8) for the input signals $E_n$, $F_n$ for producing the outputs $E_{n-1}$, $F_{n-1}$ of the flip-flop circuits FF5 and FF6, respectively. A6 to A9 are AND circuits; OR3 and OR4 are OR circuits; INV is an inverter; EXOR 3 is an exclusive OR circuit; and $c1$ is the clock.

When the input signals $E_n$ and $F_n$ are (0, 0) or (1, 1), the output of exclusive OR circuit EXOR 3 is "0". Therefore, the input signals are directly output via the AND circuit A9 and OR circuits OR3 and OR4.

When the input signals $E_n$ and $F_n$ are (1, 0) or (0, 1), the output of exclusive OR circuit EXOR 3 becomes "1" and the clock is applied to the flip-flop circuits FF5 and FF6 via the AND circuit A8; these flip-flop circuits thus are set according to the input signals. The output $e_n$, $f_n$ obtained as a result of the logic operations of equations (7) and (8) performed by the logic circuit 58 are output via the AND circuit A6 and A7 and OR circuits OR3 and OR4.

The flip-flop circuits FF5 and FF6 are provide for storing the input signals $E_n$ and $F_n$ of (1,0) or (0,1), while the exclusive OR circuit EXOR 3 is provided for output of the input signals $E_n$, $F_n$ directly, when they are (0,0) or (1,1) and maintaining the status of the flip-flops FF5 and FF6 unchanged.

Figure 16:
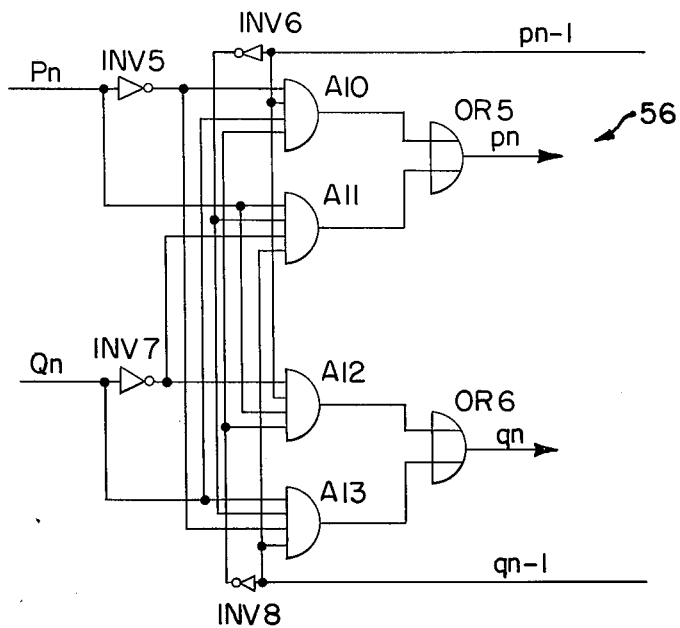
FIG. 16 is a logic schematic of the logic circuit 56 of FIG. 14.

FIG. 16 is a detailed logic diagram of the logic circuit 56 of FIG. 14. In this figure, A10 and A13 are AND circuits; OR5 and OR6 are OR circuits; and INV 5 to INV 8 are inverters.

Figure 17:
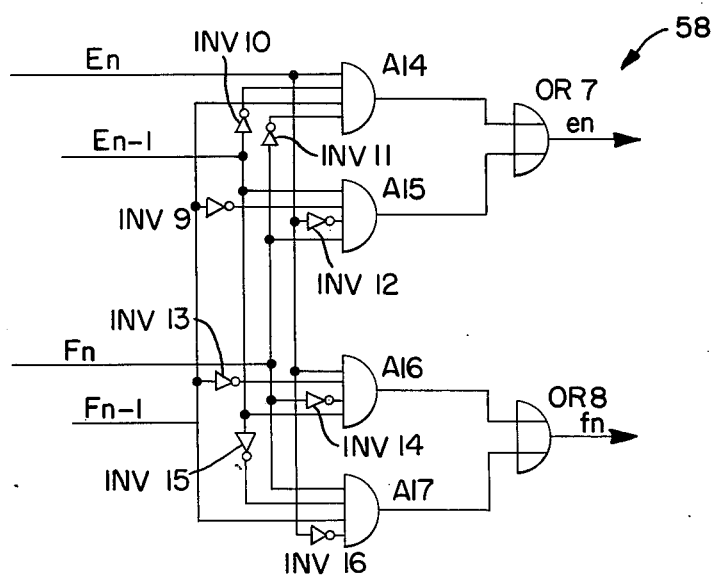
FIG. 17 is a schematic of the logic circuit 58 of FIG. 15.

FIG. 17 is a detailed logic diagram of the logic circuit 58 of FIG. 15. In this figure, A14 to A17 are AND circuits; OR7 and OR8 are OR circuits; and INV 10 to INV 16 are inverters.

It will be apparent that many modifications and variations may be effected without departing from the scope of the novel concept of this invention. Therefore, it is intended by the appended claims to cover all such modifications and variations which fall within the true spirit and scope of the invention.

What we claim is:

1. A carrier regeneration circuit for regenerating a carrier from a QAM signal produced by a quadrature partial response modulation system which amplitude modulates quadrature-related carriers of a common frequency with respective ones of two parallel series of signals subjected to partial response conversion, said carrier regeneration circuit comprising:
   probability decision means for making a decision as to the received data code in accordance with respective probabilities of generation of specified, demodulated data code combinations, and for generating a predetermined output corresponding to said decided, received data code; and
   means for regenerating said carrier, said regenerated carrier having a phase ambiguity, and for maintaining the phase ambiguity of the regenerated carrier at a multiple of 90° by selectively shifting the phase of the regenerated carrier by 45° in response to said predetermined output of said probability decision means.

2. A carrier regeneration circuit as recited in claim 1 wherein said probability decision means comprises:
   a NOR circuit receiving as first and second inputs, two parallel series of demodulated signals and producing outputs of two different levels, in accordance with the combinations of said inputs thereto,
   an integrating circuit for receiving and integrating the output of said NOR circuit and producing integrated outputs of first and second different levels representing the respective probabilities of said specified data code combinations, and a recognition circuit receiving the output of said integrating circuit and producing corresponding, different control outputs in accordance with said different levels of said integrating circuit outputs, as the output of said probability decision means.

3. A carrier regeneration circuit as recited in claim 2, wherein said recognition circuit comprises:
a pulse generator for producing as an output a pulse train of lower repetition rate than that of the data signals and of narrower width,
a discriminator circuit receiving the output of said integrating circuit and the output of said pulse generator, said discriminator circuit producing first and second outputs as a function of the output levels of said integrating circuit, and being driven to a given one of said outputs by each output pulse of said pulse generator; and
a flip-flop circuit receiving and set to corresponding states in accordance with the first and second outputs of said discriminator circuit.

4. A carrier regeneration circuit as recited in claim 3, wherein said discriminator circuit comprises:
comparator means for receiving the output of said integrating circuit, and for comparing said output of said integrating circuit with a reference voltage, and
an AND circuit receiving the output of said comparator means and of said pulse generator, the output of said AND circuit comprising the output of said discriminator circuit supplied to said flip-flop.

5. A carrier regeneration circuit as claimed in claim 2, wherein said carrier regeneration circuit comprises:
a first multiplier for multiplying the input QAM signal by a factor of 4,
a driver controlled by the output of said probability decision circuit,
modulator means which modulates the output of said first multiplier by the output of said driver,
a voltage controlled oscillator,
a second multiplier for multiplying the output of said voltage controlled oscillator by a factor of 4,
phase detector means receiving the outputs of said second multiplier and of said modulator means and producing an output representing the phase difference therebetween,
filter means receiving the output of said phase detector means and producing a filtered output, and
means for feeding said filtered output back to said voltage controlled oscillator.

6. A carrier regeneration circuit as claimed in claim 2, wherein said carrier regeneration circuit comprises:
a multiplier for multiplying the input QAM signal,
a voltage controlled oscillator,
a phase detector receiving the outputs of said voltage controlled oscillator and of said multiplier,
a low-pass-filter receiving the output of said phase detector and producing an output and means for feeding said output back to the input of said voltage controlled oscillator,
a first divider for dividing the output of said voltage controlled oscillator by a factor of 2,
an exclusive OR circuit receiving the outputs of said first divider and said probability decision circuit, and
a second divider for divising the output of said exclusive OR circuit by a factor of 4.

7. In a quadrature partial response modulation system for transmission of digital data wherein the data is presented, as two parallel series of digital signals, to corresponding partial response converter means, and wherein quadrature-related carriers of a common frequency are modulated by corresponding partial response converted parallel signals and combined to form a QAM signal for transmission, said system including a receiver portion having means for dividing the received QAM signal into corresponding first and second parallel signals, means for synchronously demodulating the said parallel signals in response to quadrature related components of a carrier regenerated in the receiver, and means for generating level decisions for the respective demodulated first and second signals, a carrier regeneration circuit comprising:
probability decision means including an NOR gate receiving said parallel output signals of said level decision circuits and producing an output of a first or second value as a function of the combinations of said received parallel output signals of said level decision circuits, integration means receiving the output of said NOR gate for integrating the output of said NOR gate to provide integration means output values, discriminator means for receiving the integrated output of said NOR gate, and for producing corresponding first and second outputs as a function of the respective integration means output values, and a bistable circuit receiving the first and second outputs of said discriminator means, and set to corresponding first and second states thereof in accordance with the first and second outputs of said discriminator means;
means for regenerating said carrier, including means for generating a signal of said common frequency and related to the phase of said carrier by an ambiguity of $45° \pm g \cdot 90°$ (where $g$ is an integer); and
carrier regeneration control means responsive to one of said outputs of said bistable circuit for selectively shifting the phase of said signal by 45° and thereby controllably maintaining the phase ambiguity of the regenerated carrier at $g \cdot 90°$.

* * * * *

UNITED STATES PATENT AND TRADEMARK OFFICE
CERTIFICATE OF CORRECTION

PATENT NO. : 4,114,710
DATED : September 19, 1978
INVENTOR(S) : Tadayoshi Katoh et al It is certified that error appears in the above-identified patent and that said Letters Patent are hereby corrected as shown below:

Column 4, line 4, "$e_n$, $f_n$" should be --$E_n$, $F_n$--.
Column 4, line 52, after "3(c)" insert --,--.
Column 4, line 53, delete ",".
Column 5, line 16, after "4" insert --,--.
Column 5, line 17, delete "," before "6".
Column 8, line 64, "370"" should be --"0"--.
Column 10, line 10, "(V.C.O.)" should be --(U.C.O.)--.
Column 10, line 36, start a new paragraph beginning with "$V_{CC}$, $V_{EE}$".
Column 12, line 16, "provide" should be --provided--.

Signed and Sealed this

Ninth Day of January 1979

[SEAL]

Attest:

RUTH C. MASON
Attesting Officer

DONALD W. BANNER
Commissioner of Patents and Trademarks